US011096256B2

(12) United States Patent
Caprara et al.

(10) Patent No.: US 11,096,256 B2
(45) Date of Patent: Aug. 17, 2021

(54) LIGHTING APPARATUS WITH CONTROLLABLE LIGHT DISTRIBUTION

(71) Applicant: Schreder S.A., Brussels (BE)

(72) Inventors: Roxane Caprara, Neupre (BE); Michel Delvaux, Henri-Chapelle (BE)

(73) Assignee: Schreder S.A., Brussels (BE)

( * ) Notice: Subject to any disclaimer, the term of this patent is extended or adjusted under 35 U.S.C. 154(b) by 22 days.

(21) Appl. No.: 16/633,275

(22) PCT Filed: Jul. 10, 2018

(86) PCT No.: PCT/EP2018/068676
§ 371 (c)(1),
(2) Date: Jan. 23, 2020

(87) PCT Pub. No.: WO2019/020366
PCT Pub. Date: Jan. 31, 2019

(65) Prior Publication Data

US 2021/0160986 A1 May 27, 2021

(30) Foreign Application Priority Data

Jul. 24, 2017 (BE) .................................. 2017/5518

(51) Int. Cl.
*H05B 45/10* (2020.01)
*B60Q 3/80* (2017.01)
(Continued)

(52) U.S. Cl.
CPC ............ *H05B 45/44* (2020.01); *H05B 45/10* (2020.01); *H05B 47/155* (2020.01)

(58) Field of Classification Search
CPC ........ H05B 45/10; H05B 45/20; H05B 45/44; H05B 47/10; H05B 47/17; H05B 47/155;
(Continued)

(56) References Cited

U.S. PATENT DOCUMENTS 8,100,552 B2 * 1/2012 Spero ................. F21V 23/0435 362/231
8,820,963 B2 * 9/2014 Olsen ..................... F21V 5/008 362/244

(Continued)

OTHER PUBLICATIONS

PCT International Search Report and Written Opinion, PCT International Application No. PCT/EP2018/068676, dated Sep. 25, 2018, 16 pages.

*Primary Examiner* — Haissa Philogene
(74) *Attorney, Agent, or Firm* — McDonnell Boehnen Hulbert & Berghoff LLP

(57) ABSTRACT

A lighting apparatus comprising: a support substrate; a plurality of subsets mounted on the support substrate, said plurality of subsets comprising at least a first subset having a plurality of LEDs and a second subset having at least one LED; a corresponding plurality of lens elements mounted such that each subset is covered by a lens element of the plurality of lens elements; wherein LEDs of the plurality of subsets are divided in a plurality of groups; wherein the plurality of groups comprises at least, a first group of LEDs comprising at least one LED of the first subset and at least one LED of the second subset, and a second group of LEDs comprising at least one LED of at least the first subset; a drive and control means configured to drive selectively the plurality of groups of LEDs wherein LEDs of the same group are driven simultaneously.

20 Claims, 7 Drawing Sheets

(51) Int. Cl.
*H05B 45/44* (2020.01)
*H05B 47/155* (2020.01)

(58) Field of Classification Search
CPC ... B60Q 3/56; B60Q 3/64; B60Q 3/66; B60Q 3/80; G02B 6/003; G02B 6/0031; G02B 6/0083; G02B 6/0091; F21V 23/005; H05K 1/189; H05K 2201/10106; F21Y 2115/10; F21Y 2113/00
See application file for complete search history.

(56) References Cited

U.S. PATENT DOCUMENTS

| | | | |
|---|---|---|---|
| 8,988,005 B2 | 3/2015 | Jungwirth et al. | |
| 9,192,026 B2 | 11/2015 | Marquardt et al. | |
| 10,821,890 B2 * | 11/2020 | Diana | G02B 6/0021 |
| 2006/0291204 A1 | 12/2006 | Marka et al. | |
| 2010/0110671 A1 * | 5/2010 | Gordin | G02B 19/0028 362/228 |
| 2014/0117386 A1 | 5/2014 | Rol et al. | |
| 2014/0140069 A1 * | 5/2014 | Premysler | F21S 8/085 362/308 |
| 2015/0009677 A1 | 1/2015 | Catalano | |
| 2016/0069540 A1 | 3/2016 | Kjeldsen et al. | |
| 2016/0143101 A1 | 5/2016 | Moore et al. | |
| 2017/0164439 A1 | 6/2017 | Reed | |

* cited by examiner

LIGHTING APPARATUS WITH CONTROLLABLE LIGHT DISTRIBUTION

CROSS-REFERENCE TO RELATED APPLICATION

The present application is a national stage entry of PCT/EP2018/068676 filed Jul. 10, 2018, which claims priority to BE 20175518 filed on Jul. 24, 2017, the contents of each of which are hereby incorporated by reference.

FIELD OF INVENTION

The present invention relates to lighting apparatus. Particular embodiments relate to a lighting apparatus with a controllable light distribution to adapt to a desired usage.

BACKGROUND

LED devices have an increasing number of applications. Devices that are able to emit white light are especially interesting due to their potential in replacing conventional light sources, e.g. halogen, fluorescent, incandescent lights. However, with respect to an outdoor usage of lighting devices, e.g. luminaires, it is common to have different designs of lens elements, LEDs arrangements, luminaire heads, luminaires bases such as lamp posts, etc. depending on the environment that needs an illumination. Thus, a large diversity of parts has to be stored notably for maintenance and replacement procedures, resulting in complex procedures.

By outdoor lighting devices and in particular outdoor luminaires, it is meant luminaires which are installed on roads, tunnels, cycle paths, pedestrian paths or in pedestrian zones, for example, and which can be used notably for the lighting of roads and residential areas in the public domain, as well as the lighting of private parking areas and access roads to private building infrastructures.

Many solutions exist for indoor lighting with devices able to modify the direction or intensity of light beam depending on the desired atmosphere of a room or a particular light motif, as well as changing the light colour. However lighting apparatus with controllable light distribution for outdoor usage are not known at the time of the present invention, even though it would simplify luminaire installations. In this particular instance, "controllable light distribution" refers to a lighting apparatus for which, e.g. the size, shape, and/or intensity profile of the light beam emitted by the lighting apparatus can be controlled. At the same time, such a lighting apparatus would lessen the number of parts to be stored since the parts could be identical for different types of environments, e.g. large or small roads. Only the light distribution on site would need to be adapted to the usage. Hence, there is a need for lighting apparatus with a controllable light distribution presenting these characteristics.

US 2006/0291204 discloses a lighting apparatus including a number of light modules oriented to illuminate a work site, an array of individually controllable lights disposed on each of the light modules, and a lighting controller configured to individually control the lights disposed on the light modules to selectively define concentric illumination zones.

US 2016/0143101 discloses a system and method for operating one or more light emitting devices. The intensity of light provided by the one or more light emitting devices is adjusted responsive to a temperature of the one or more light emitting device.

US 2017/0164439 discloses an illumination system with selectively adjustable illumination patterns. Implementations allow scheduled dimming of luminaires, dimming in defined physical directions and scheduled adjustment of light patterns.

SUMMARY

The object of embodiments of the invention is to provide a lighting apparatus which is more polyvalent in its use with respect to its installation in different environments. More in particular, embodiments of the invention aim to provide a lighting apparatus whose light distribution is controllable to adapt to diverse illumination conditions.

According to a first aspect of the invention, there is provided a lighting apparatus. The lighting apparatus comprises:

- a support substrate;
- a plurality of subsets mounted on the support substrate, said plurality of subsets comprising at least a first subset having a plurality of LEDs and a second subset having at least one LED;
- a corresponding plurality of lens elements mounted such that each subset is covered by a lens element of the plurality of lens elements;
- wherein LEDs of the plurality of subsets are divided in a plurality of groups;
- wherein the plurality of groups comprises at least:
- a first group of LEDs comprising at least one LED of the first subset and at least one LED of the second subset;
- a second group of LEDs comprising at least one LED of at least the first subset;
- a drive and control means configured to drive selectively the plurality of groups of LEDs wherein LEDs of the same group are driven simultaneously.

Embodiments of the invention are based inter alia on the insight that different outdoor illumination situations typically demand for different luminaires having different specific features such as LEDs of a particular type, disposed within a specific 2D arrangement on a support substrate, and connected to each other by a specific routing, together with particular optics arrangement (i.e. lens, reflector, collimator, etc.). Installing different types of luminaires makes the installation task unnecessarily complicated. Moreover it adds the disadvantage of having to store many different parts for production and/or for maintenance. This problem is overcome by a lighting apparatus as defined above.

In the lighting apparatus of the present invention, a plurality of LEDs is divided in a plurality of groups. The plurality of groups is organized with respect to a drive and control means. Each group can be driven selectively by the drive and control means.

Selectively driving the power provided to each group of LEDs will allow as a result controlling the light distribution of the lighting apparatus. Indeed, the drive and control means will allow to drive the first group of LEDs and/or the second group of LEDs. It is to be noted that part or the entirety of the plurality of groups may be switched on in a shared time frame and may be driven independently by the drive and control means. Thus the lighting apparatus may emit a light beam with a different size, shape, and/or intensity profile depending on which group(s) of the plurality of groups are driven by the drive and control means, and how the group(s) of the plurality of groups are driven. For example, there may be a first group of LEDs comprising at least one LED of the first subset of LEDs and at least one LED of the second subset of LEDs; the first group may be driven by a first driving current. There may be a second group of LEDs comprising at least one LED of at least the first subset of LEDs; the second group may be driven by a second driving current similar or different from the first driving current and in a time frame similar or different from the first subset of LEDs. It makes the lighting apparatus very versatile and removes the need of having different luminaires for different outdoor illumination situations. Moreover, the lighting apparatus of the present invention may offer a larger and more continuous scope of light distributions compared to what was available with the different prior luminaires adapted to specific outdoor illumination situations.

Moreover, exemplary embodiments of the lighting apparatus according to the invention also present the advantage to be able to vary overtime its light distribution once installed in its final outdoor location, in accordance with changes occurring in its environment. For instance, the light distribution of a particular embodiment of an outdoor lighting apparatus which is not oriented in an optimum way or for which the orientation has changed, for example, as a result of the effect of unplanned-for forces such as unusually high wind loads or as a result of settling phenomena in the vicinity of the base of the lighting apparatus, can be adapted easily. Further, with an embodiment of such a lighting apparatus it is, for example, possible to adapt its light distribution during rainy weather with a wet and highly reflective roadway surface in such a way that the traffic is not dazzled. Furthermore, another embodiment of the lighting apparatus makes it possible to adapt its light distribution in order to temporarily deflect part of the luminous flux onto normally unlit sections. It is therefore possible, for example, for a footpath or cycle path to be illuminated by changing the light distribution during the passage of a cyclist or pedestrian. A variable light distribution in the lighting apparatus in embodiments of the present invention can therefore be used to achieve safer and at the same time more energy-saving illumination of the respective outdoor situation.

US 2006/291204 does not disclose to provide a plurality of lens elements mounted such that each subset is covered by a corresponding lens element of the plurality of lens elements. In US 2006/291204, changes in the light distribution of the lighting apparatus do not occur on an individual lens level but on the level of illumination zones.

According to a preferred embodiment, the drive and control means is configured for controlling the plurality of groups according to a plurality of control schemes comprising at least:

a first control scheme for which the plurality of groups is switched on;

a second control scheme for which at least one group of LEDs of the plurality of groups is switched off, and at least one group of LEDs of the plurality of groups is switched on.

In this manner, the lighting apparatus can be used in two different control schemes for at least two different illumination situations. A first control scheme for which the plurality of groups is switched on will allow adapting to a first illumination situation. A second control scheme for which at least one group of LEDs of the plurality of groups is switched off, and at least one group of LEDs of the plurality of groups is switched on will allow to adapt to a second illumination situation. Having certain LEDs switched on or off will vary the light distribution. The light distribution includes both the size and shape of the light beam, as well as its intensity profile.

According to an exemplary embodiment, the plurality of control schemes further comprises:

a third control scheme for which at least one group of LEDs of the plurality of groups is switched on at a dimmed intensity.

In this way, the light distribution may be varied by controlling the intensity of the LEDs used. For instance one or more groups of LEDs may be driven with a current below the maximum driving current of the LEDs such that a light intensity may be reached according to a desired use. In a possible control scheme some, but not all, of the plurality of groups of LEDs may be in a dimmed state, whilst the other one or more groups of LEDs are switched on in an undimmed state or switched off. In another possible control scheme, a first group of the plurality of groups may be in a first dimmed state and a second group may be in a second dimmed state different from the first dimmed state.

According to an exemplary embodiment, each subset of the plurality of subsets has the same number of LEDs.

In this way, manufacturing of the lighting apparatus is simpler. Additionally it could allow the overall intensity profile to be more uniform. It might enable an easier and more systematic organization of the plurality of LEDs into groups.

According to a preferred embodiment, the drive and control means may comprise:

a digital communication interface configured to receive signals for performing the controlling of the driving of the plurality of groups.

In this way, the controlling can be achieved through a wireless or wired digital communication interface configured to receive external control signals.

According to an exemplary embodiment, the drive and control means comprises at least one of the following:

a first driver for driving the first group of LEDs and a second driver for driving the second group of LEDs, preferably a multi-channel driver comprising the first driver for driving the first group of LEDs and the second driver for driving the second group of LEDs;

a driver common to the first group and the second group of LEDs, and a plurality of controllable switching elements arranged for being controlled to selectively drive only the first group of LEDs, or only the second group of LEDs, or the first group and the second group of LEDs together.

In this manner, different options are available to fulfil the role of the drive and control means. According to the first option, each group of LEDs can be driven by its respective driver to increase the variety of light distributions. Further, with each driver there may be associated a respective dimmer. Preferably, the respective drivers will be a plurality of driving elements in a multi-channel driver. This may be an external dimmable multi-channels driver which may allow performing a dimming on the first and/or second group of LEDs to achieve different dimming profiles. According to the second option, a single driver can be used for all groups of LEDs as well as a plurality of controllable switching elements for a simpler technological approach to obtain different control schemes. The controllable switching elements may then be controlled manually, or via a digital controller. The controller and the plurality of drivers may be designed as one or more integrated circuits on the support substrate.

According to an exemplary embodiment, the plurality of subsets comprises at least three subsets of LEDs, preferably four subsets of LEDs.

Preferably, in this particular embodiment, the first group of LEDs comprises at least one LED from each subset.

In this way, an overall intensity range can be reached and/or the versatility of the lighting apparatus is improved. It might also provide an easier scalability of the apparatus according to a desired use.

According to a preferred embodiment, the plurality of groups of LEDs comprises at least three groups of LEDs, preferably at least four groups of LEDs.

In this manner, the variety of light distributions is increased and the versatility of the lighting apparatus is improved.

According to a preferred embodiment, the at least one LED of the first subset included in the first group is different from the at least one LED of the first subset included in the second group. More generally it is preferred that the plurality of groups do not overlap with each other.

In that manner, the drive and control means can be simpler.

According to an exemplary embodiment, each of the plurality of lens elements comprises a free form lens element having a first surface and a second surface located on opposite sides thereof, wherein the first surface is a convex surface and the second surface is a concave surface.

In this way, a LED placed on the second surface side of the lens element at proximity of the optical axis of the lens element has its emitted light being spread. The shape of the lens element and position of the lens element with respect to the LED will influence the distribution and intensity profile of light and will have to be taken into account depending on the intended use of the lighting apparatus.

According to a preferred embodiment, the lens element has a maximum longitudinal dimension different from a maximum lateral dimension.

In this manner, the light beam shape could be more easily changed by varying the light intensity of a certain LED associated to a lens element than if the lens element had a rotational symmetry, e.g. a spherical lens. It is to be noted that also other optical elements, such as a reflector, a diffuser and/or a filter, may be present. Also those other optical elements, if adjustable, may be adjusted on a group level.

According to an exemplary embodiment, at least the first subset is arranged as an array of LEDs with at least two rows of LEDs and at least two columns of LEDs. In a preferred embodiment, each subset is arranged as an array of LEDs with at least two rows of LEDs and at least two columns of LEDs.

In this way, the mounting and connecting of the plurality of LEDs on the support substrate is simplified. In such an embodiment, the plurality of control schemes may comprise a control scheme for which a row of the at least two rows of LEDs of the first subset is switched off, and at least another row of the at least two rows of LEDs of the first subset is switched on.

In a particular embodiment, each subset is arranged as an array of LEDs with at least two rows of LEDs and at least two columns of LEDs; another control scheme might be a control scheme for which a row of the at least two rows of LEDs of the plurality of subsets is switched off, and at least another row of the at least two rows of LEDs of the plurality of subsets is switched on.

In this manner, the organization of the first LED subset as an array allows a fourth control scheme based on the rows of the LED array which is simpler to define. One could also have another control scheme based on the columns of the LED array.

According to an exemplary embodiment, the first group of LEDs comprises a first row of LEDs of the at least two rows of LEDs of the first subset, and the second group of LEDs comprises a second row of LEDs of the at least two rows of LEDs of the first subset.

According to a preferred embodiment, the first group of LEDs comprises a first row of LEDs of the plurality of subsets, and the second group of LEDs comprises a second row of LEDs of the plurality of subsets.

In this way, it is simpler to divide LED subsets in groups based on the rows of the LED array. One could also have other group divisions based on the columns of the LED array.

According to a preferred embodiment, each subset comprises at least 4 LEDs, preferably 6 LEDs, more preferably 9 LEDs, and most preferably 12 LEDs.

In this manner, the number of light distribution possibilities of the lighting apparatus increases. It also makes it possible to organize the LED subsets in arrays of at least two rows or two columns.

With a higher number of LEDs, a higher number of different groups may be defined, adding to the versatility of the lighting apparatus.

According to an exemplary embodiment, the plurality of subsets is configured to emit light having substantially the same colour.

In this way, a lower number of parameters have to be taken into account to configure the light distribution.

In a particular embodiment, the difference of hue between the light emitted by each LED within the plurality of subsets may be equal to or smaller than nine MacAdam ellipses, preferably equal to or smaller than seven MacAdam ellipses, more preferably equal to or smaller than five MacAdam ellipses.

According to a preferred embodiment, each group of the plurality of groups comprises at least one LED of each subset, said at least one LED being preferably similarly positioned in each subset.

In this manner, the light distribution of a LED subset associated to a lens element can be more easily replicated.

In other embodiments said at least one LED may be at different positions in the subsets. More generally any regular or irregular grouping falls within the scope of the invention. For example LEDs of the same colour of different subsets may be put in the same group. If LEDs of the same colour are in different positions within the subsets, each group of the plurality of groups may comprises at least one LED of each subset of a particular colour, said at least one LED being positioned in different positions within the different subsets.

The skilled person will understand that the hereinabove described technical considerations and advantages for lighting apparatus embodiments also apply to the below described corresponding luminaire embodiments, mutatis mutandis.

According to a preferred embodiment, there is provided a luminaire having a lighting apparatus according to any one of the claims of the lighting apparatus.

The skilled person will understand that the hereinabove described technical considerations and advantages for lighting apparatus embodiments also apply to the below described corresponding method embodiments, mutatis mutandis.

According to an exemplary embodiment, there is provided a method for controlling a lighting apparatus of any one of the embodiments of the lighting apparatus disclosed above. The method comprises controlling the driving of the plurality of LEDs to drive selectively the plurality of groups of LEDs, such that LEDs of the same group are driven simultaneously.

It is to be noted that the method may be applied locally in the lighting apparatus or partially remotely, e.g. in a remote server, wherein control signals are sent, e.g. wirelessly or in a wired way to a receiving interface, e.g. a wireless or wired digital communication interface in the lighting apparatus.

According to an exemplary embodiment, the controlling comprises controlling the plurality of groups according to a plurality of control schemes comprising at least:

- a first control scheme for which the plurality of groups is switched on;
- a second control scheme for which at least one group of LEDs of the plurality of groups is switched off, and at least one group of LEDs of the plurality of groups is switched on.

Preferably also a third control scheme is provided for which at least one group of LEDs of the plurality of groups is switched on at a dimmed intensity.

According to a further aspect of the invention, there is provided a computer program comprising computer-executable instructions to perform the method, when the program is run on a computer, according to any one of the steps of any one of the embodiments disclosed above.

It will be understood by the skilled person that the features and advantages disclosed hereinabove with respect to embodiments of the lighting apparatus and the method may also apply, mutatis mutandis, to embodiments of the computer program.

In an exemplary embodiment the support substrate is a printed circuit board (PCB). The support substrate will act as a support for the metal traces connecting the LEDs as well as to dissipate heat generated by the LEDs during operating times of the lighting apparatus. The plurality of LEDs is divided in a plurality of subsets.

Preferably, the LEDs within a group will be provided with the same power for emitting light at similar intensities.

Preferably, each LED of the plurality of subsets is part of a group of the plurality of groups.

The plurality of subsets does not have to comprise the same number of LEDs in each subset. There may be one subset comprising a plurality of LEDs, and a second subset having only one LED. There may also be more than two subsets. Also, the plurality of groups does not have to comprise the same number of LEDs in each group.

Depending on the desired end-application, a sufficient number of LEDs and LED subsets are chosen to have a sufficient illumination from the lighting apparatus.

Preferably, the subsets are mounted on the support substrate in such a way that their respective optical centres are distinct from each other. Indeed, a corresponding plurality of lens elements may be mounted such that each subset is covered by a lens element of the plurality of lens elements. Each lens element spreads the light emitted by its respective LED subset depending on the shape and position of the lens element with respect to the LED subset.

BRIEF DESCRIPTION OF THE FIGURES

This and other aspects of the present invention will now be described in more detail, with reference to the appended drawings showing a currently preferred embodiment of the invention. Like numbers refer to like features throughout the drawings.

DESCRIPTION OF EMBODIMENTS

Figure 1:
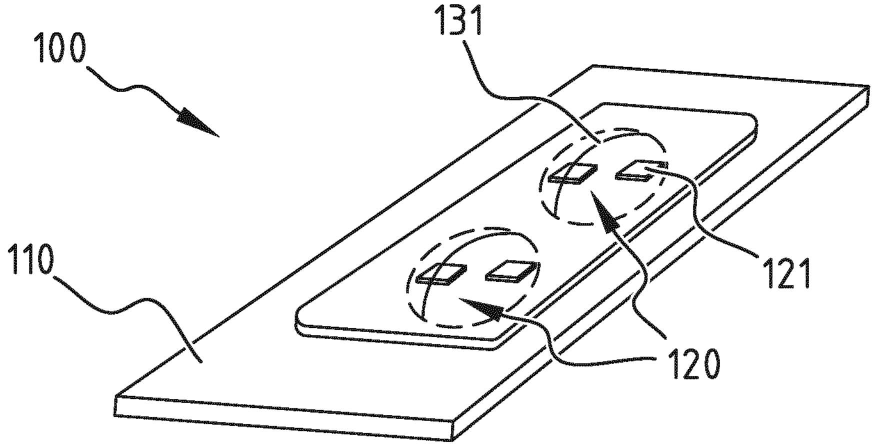
FIG. 1 illustrates schematically a perspective view of an exemplary embodiment of a lighting apparatus according to the invention.

FIG. 1 illustrates schematically a perspective view of an exemplary embodiment of a lighting apparatus according to the present invention. The lighting apparatus 100 comprises a support substrate 110, a plurality of subsets 120, and a plurality of lens elements 131. In the exemplary embodiment each subset 120 comprises a plurality of LEDs 121, in the illustrated embodiment two LEDs 121. The plurality of subsets 120 is disposed on top of the support substrate 110. The plurality of lens elements 131 is mounted such that each subset 120 is covered by a lens element 131.

In the exemplary embodiment shown in FIG. 1, the lens elements 131 are similar in size and shape. In another exemplary embodiment, the lens elements 131 are different from each other.

The lens element 131 may be free form in the sense that it may not comprise a spherical portion.

The lens element 131 comprises a first surface and a second surface located on opposite sides. The second surface faces the plurality of LEDs 121. The first surface is a convex surface.

The second surface is a concave surface, but may also be a planar surface.

The lens elements 131 are in a transparent or translucent material. They may be in optical grade silicone, glass, poly(methyl methacrylate) (PMMA) or polycarbonate (PC).

While each lens element 131 is centred over a corresponding LEDs subset 120 as shown in FIG. 1, it may be configured otherwise as will be understood below.

The plurality of lens elements 131 shown in FIG. 1 may be part of an integrally formed lens module. In other words the lens elements 131 may be interconnected so as to form a lens module comprising the plurality of lens elements 131. The lens module may be formed, e.g. by injection moulding, casting, and transfer moulding or in another appropriate manner. Alternatively, the lens elements 131 may be separately formed, e.g. by any one of the above mentioned techniques.

Moreover, the method of mounting the plurality of lens elements 131 over the LEDs subsets 120 may vary, e.g. mounted, bonded, or appropriately connected directly to the underlying LEDs 121, or to the support substrate 130, or in the structure of the final application.

The LEDs 121 are mounted near each other in LED subsets 120 on the support substrate 110. The LED subsets

120 may be separated by a distance that is adequate to distinguish the optical centres of each LED subset 120.

The LEDs 121 may be arranged such that their respective positions in a LED subset 120 are misaligned as shown in FIG. 1.

Figure 3:
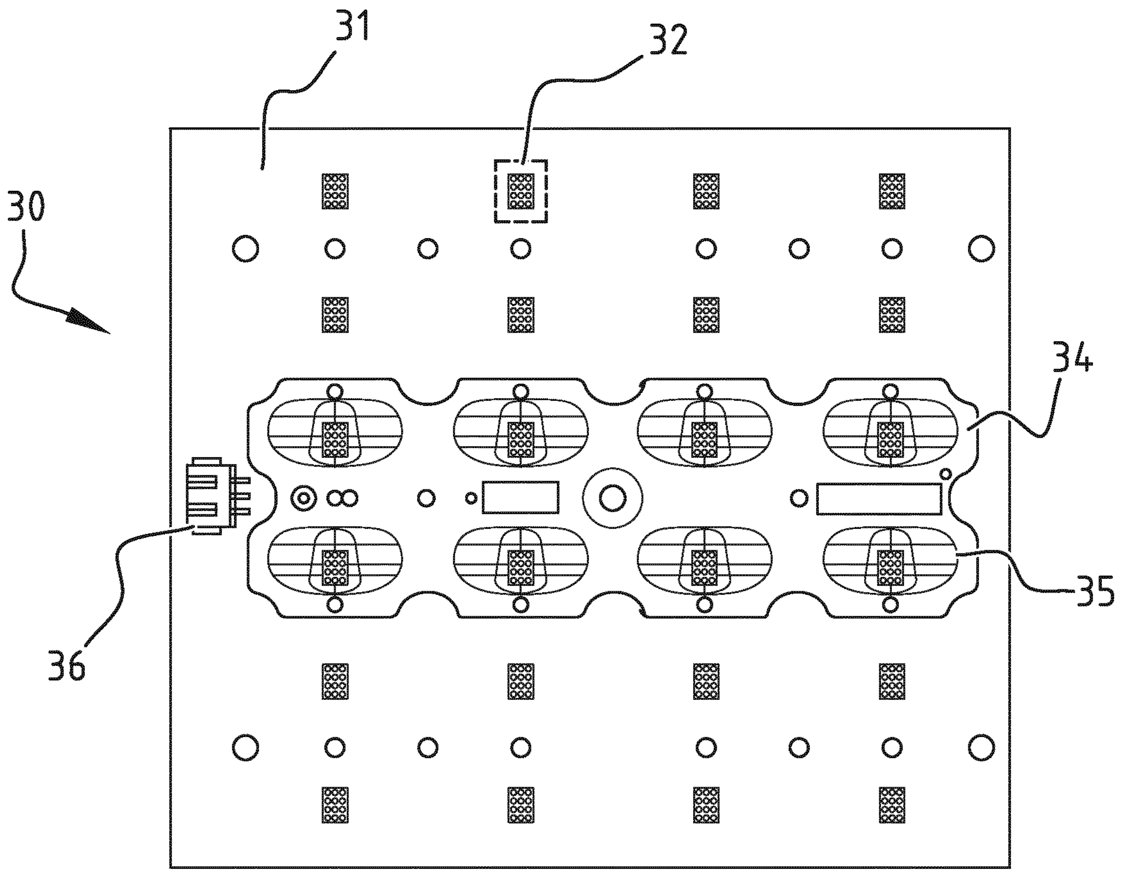
FIGS. 3 and 3A shows planar views of an exemplary embodiment of a lighting apparatus according to the invention, with FIG. 3A showing a detailed view of a subset with corresponding lens element of the embodiment of FIG. 3.

In another embodiment, see FIG. 3, the plurality of LED subsets 32 are multi-chips of LEDs in which each LED subset 32 comprises an array of LEDs.

While two LEDs 121 per subset 120 are shown in FIG. 1, it should be understood that additional LEDs, e.g. three, four, or more, may be used according to an embodiment of the present invention.

The LEDs 121, or a bonding material between the LEDs 121 and the respective lens elements 131, may include a phosphor coating to produce a desired white light.

The LEDs 121, may all have the same colour, as way of example, the difference of hue between the light emitted by each LED 121 may be equal to or smaller than five MacAdam ellipses.

The support substrate 110 may be a printed circuit board (PCB) supporting the metal traces which make the electrical connections between the LEDs 121 and the support substrate 110 while providing at the same time a thermal path for heat removal from the LEDs 121 during operation.

Figure 2:
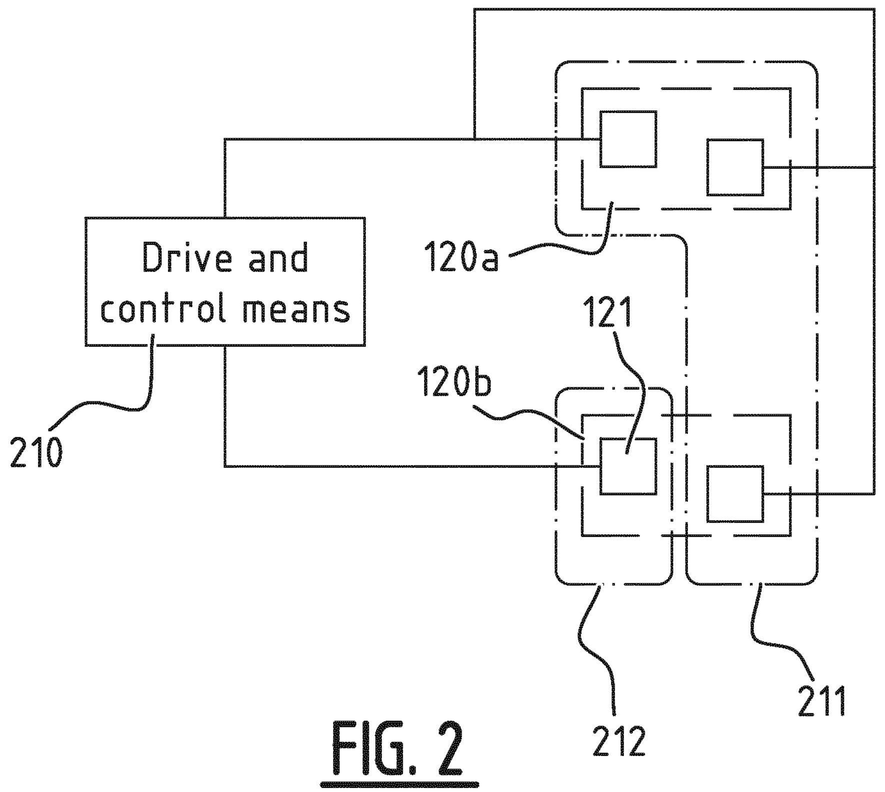
FIG. 2 schematically illustrates further an exemplary embodiment of a lighting apparatus according to the invention.

FIG. 2 schematically illustrates further an exemplary embodiment of the lighting apparatus 100 according to the present invention. As illustrated in FIG. 2, the LEDs 121 of the plurality of subsets 120*a*, 120*b* are divided into a plurality of groups 211 and 212. A first group of LEDs 211 comprises LEDs 121 of at least two LED subsets, here a first subset 120*a* and a second subset 120*b*. In the illustrated example the first group 211 comprises two LEDs 121 of the first subset 120*a*, and one LED 121 of the second subset 120*b*. A second group of LEDs 212 comprises at least one LED 121 of at least one LED subset 120*a*, 120*b*. In the illustrated example the second group 212 comprises one LED 121 of the second subset 120*b*.

A drive and control means 210 is configured to drive selectively the plurality of groups 211, 212 wherein LEDs 121 of the same group are driven simultaneously. In the illustrated example a first element (not illustrated) of the drive and control means 210 is configured to drive the three LEDs 121 of the first group 211 simultaneously. Also, a second element (not illustrated) of the drive and control means 210 is configured to drive the one LED 121 of the second group 212.

Preferably, the drive and control means 210 is configured for controlling the plurality of groups 211, 212 according to a plurality of control schemes comprising at least:

- a first control scheme for which the plurality of groups 120*a*, 120*b* are switched on; in the exemplary embodiment this would imply that all LEDs 121 are on;
- a second control scheme for which at least one group of LEDs of the plurality of groups 211, 212 is switched off, and at least one group of LEDs of the plurality of groups 211, 212 is switched on; in the exemplary embodiment, e.g. only the three LEDs 121 of the first group 211 are switched on, whilst the LED 121 of the second group 212 is switched off. Alternatively, the three LEDs 121 of the first group 211 are switched off, whilst the LED 121 of the second group 212 is switched on.

In another possible control scheme, the three LEDs 121 of the first group 211 may be in a dimmed state, whilst the LED 121 of the second group 212 is switched on in an undimmed state or switched off. In a further possible control scheme, the LED 121 of the second group 212 is in a dimmed state, whilst the three LEDs 121 of the first group 211 are switched on in an undimmed state or switched off. In still another possible control scheme, the three LEDs of the first group 211 may be in a first dimmed state, and the LED of the second group 212 may be in a second dimmed state different from the first dimmed state.

Figure 3A:
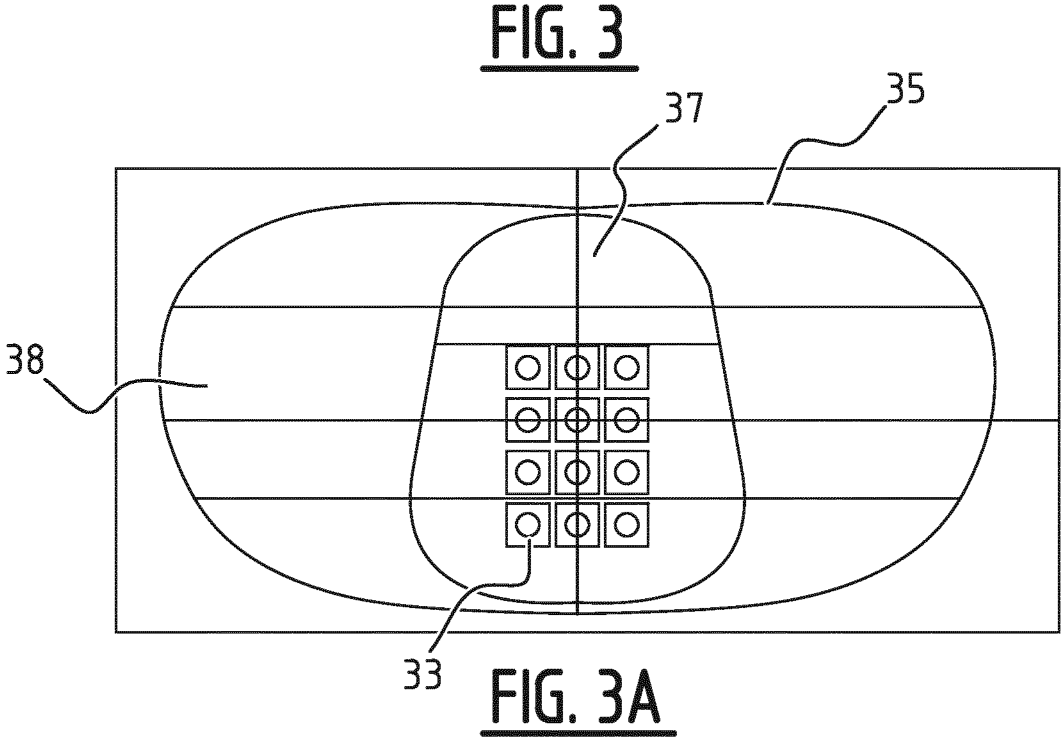

FIG. 3 and FIG. 3A shows planar views of an exemplary embodiment of the lighting apparatus according to the present invention. FIG. 3A illustrates a detailed view of a subset with corresponding lens element of the embodiment of FIG. 3. The lighting apparatus 30 comprises a support substrate 31, a plurality of subsets 32, and a corresponding plurality of lens elements interconnected here into a lens plate 34 mounted such that each subset 32 is covered by a lens element 35 of the lens plate 34. Each subset 32 comprises an array of LEDs, here a 3×4 array of 12 LEDs, i.e. an array of four rows by three columns. In alternative embodiments the array comprises more or less LEDs. Preferably the array comprises at least 4 LEDs (e.g. 2×2 or 4×1 or 1×4), more preferably at least 6 LEDs (e.g. 2×3 or 3×2 or 6×1 or 1×6), even more preferably at least 8 LEDs (e.g. 4×2 or 2×4 or 8×1 or 1×8), and most preferably at least 12 LEDs (e.g. 3×4 or 4×3 or 6×2, 2×6).

Preferably, the support substrate 31 is a printed circuit board (PCB, a.k.a. printed wired board, PWB). The array of LEDs may be provided as a multi-chip of LEDs 33. In the example illustrated in FIG. 3, twenty-four subsets, i.e. twenty-four multi-chips of LEDs 33, are provided onto the PCB in an array of six rows by four columns. In alternative embodiments, more or less subsets of LEDs 32 may be provided. Preferably, at least two subsets, preferentially at least three subsets, more preferably at least four subsets, even more preferably at least six subsets, and most preferably at least eight subsets are provided. The subsets may be aligned in an array (as illustrated), but may also be provided according to any other pattern such as for example in a circle or rosette.

An electrical connector 36 is provided to the PCB to connect the PCB to the drive and control means (not shown). The lens plate 34 is mounted over the plurality of LED subsets 32 such that eight lens elements 35 are centred over the optical centres of eight corresponding LED subsets 32.

Corresponding holes in the support substrate 31 and the lens plate 34 are supplied to allow a direct mounting of the lens plate 34 onto the support substrate 31. Three lens plates 34 may be mounted side by side to cover all the LED subsets 32 on the PCB.

Every lens elements 35 are similar in size and shape. They are elongated free form lenses in optical grade silicone for example with a transparent central portion 37 and a transparent thicker surrounding portion 38. The elongated free form lens element 35 may be less than 5 cm in length.

Figure 4A:
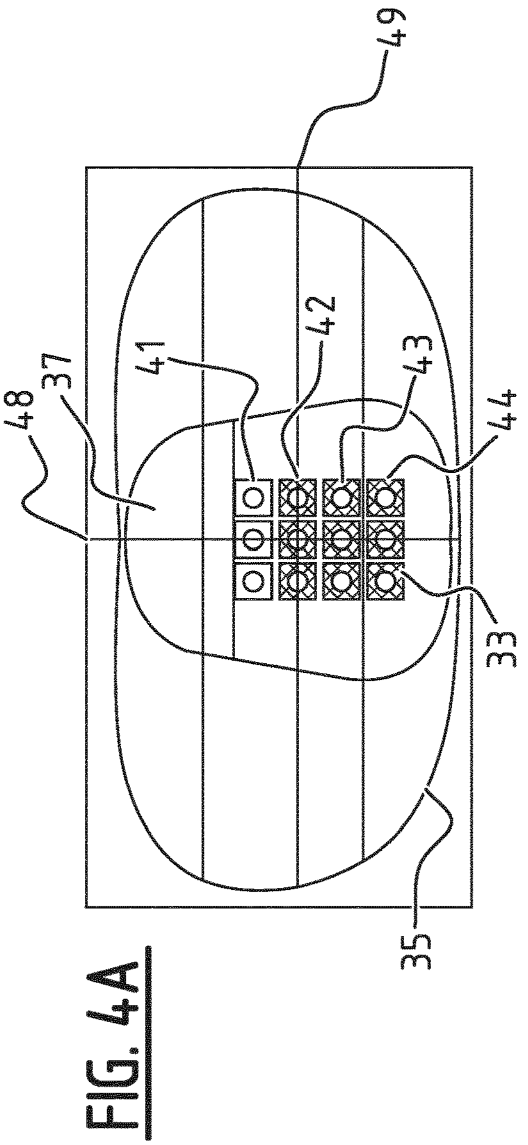
FIGS. 4A and 4B illustrate an exemplary embodiment of a light distribution setting of a lighting apparatus according to the invention.
Figure 4B:
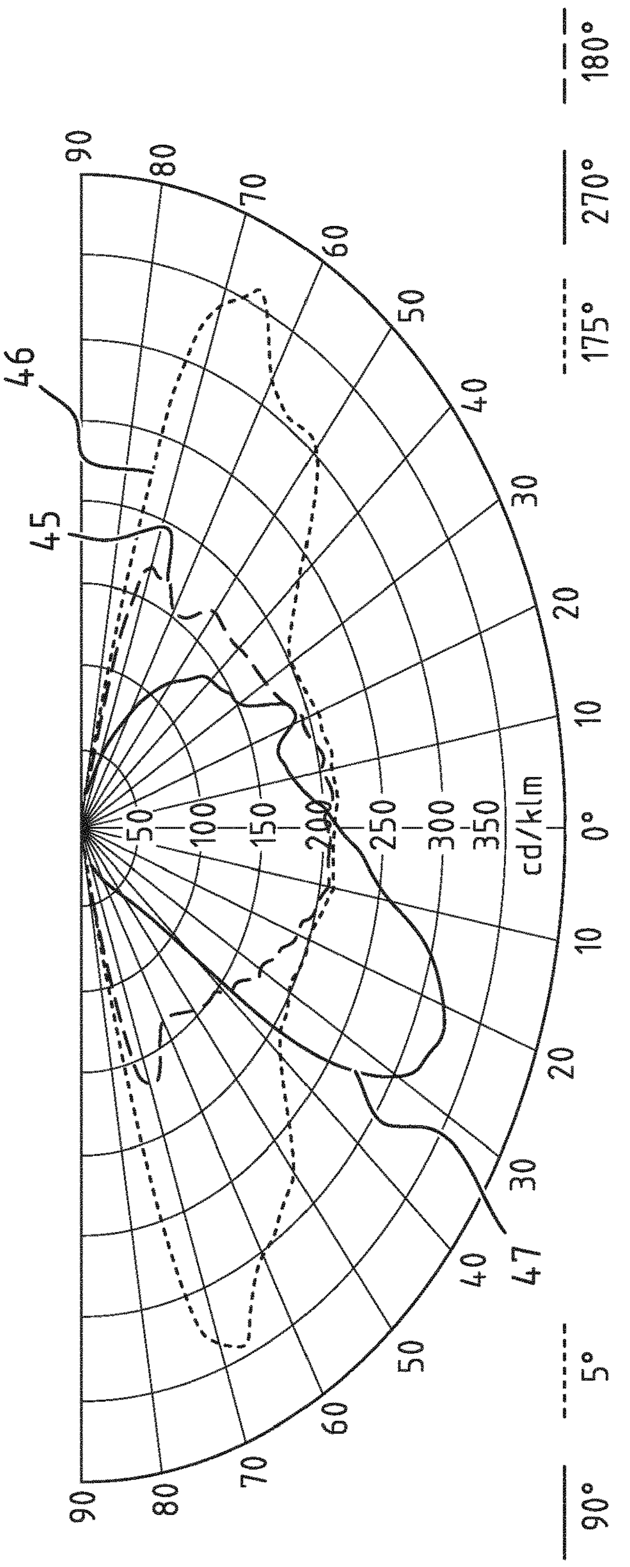

FIGS. 4A and 4B illustrate an exemplary embodiment of a light distribution setting of the lighting apparatus according to the present invention. The lighting apparatus 30 is similar to the one of FIG. 3 and FIG. 3A. FIG. 4A shows in detail a subset 32 of FIG. 3. In this embodiment a first, second, third and fourth group of LEDs may be formed by first, second, third, and fourth rows 41, 42, 43, 44 of LEDs of the plurality of subsets 32, respectively. A control and drive means is configured to drive selectively the plurality of groups of LEDs 33 according to a plurality of control schemes.

The plurality of control schemes comprises at least: a first control scheme for which the plurality of groups are switched on (e.g. all rows 41, 42, 43, 44 of all subsets are switched on), a second control scheme for which at least one group of LEDs 33 of the plurality of groups is switched off and at least one group of LEDs 33 of the plurality of groups is switched on (e.g. the first rows of all subsets are switched on and the other rows are switched off), a third control scheme for which at least one group of LEDs 33 of the plurality of groups is switched on at a dimmed intensity (e.g. the first rows are dimmed). The lighting apparatus 30 may preferably be positioned in such a way that the rows of LEDs 41-44 are parallel with respect to a circulation lane, e.g. road, sidewalk, bike path, etc. illuminated by the lighting apparatus 30. In an exemplary embodiment, the current regulation may be performed by an external dimmable multi-channels driver which may allow performing a dimming on each individual group of LEDs 33 (e.g. the first and second rows may be dimmed while the third and fourth rows are not dimmed). The control scheme may be as illustrated in FIG. 4A: the first row of LEDs 41 is switched off, and the last three rows of LEDs 42, 43, and 44 are switched on at 100% of their intensities. Optionally, each of the last three rows of LEDs 42, 43, and 44 may be switched on in an undimmed state or a dimmed state. FIG. 4B is a graph illustrating the light distribution achieved by a lighting apparatus 30 according to the control scheme described in FIG. 4A. The polar curves show the light intensity in different vertical planes at a certain angle with respect to a point source, said point source equivalent to the lighting apparatus placed horizontally with the plurality of LEDs 32 facing down. The longitudinal axis 48 of the lens element 35 corresponds to angles of 0° and 180°. The transverse axis 49 of the lens element 35 corresponds to angles of 900 and 270°. More precisely, the narrower end of the transparent central portion 37 of the lens element corresponds to the angle of 90°, and the broader end of the transparent central portion 37 of the lens element corresponds to the angle of 270°. The narrower end faces forward, and the broader end faces backward.

The polar curves are plotted in different vertical planes as a function of a lighting angle, 0° being at the vertical of the point source, and 90° being at the horizontal of the point source. From the curves 45 and 46 at 0° and 5°, it may be noticed that the light distribution, in a horizontal plane parallel to the lighting apparatus 30, is broadening quickly in a forward direction. The light distribution then narrows the more forward the light reaches. From the curve 47 at 90 it may be noticed that more light is emitted forward than backward. As way of example, a luminaire head comprising this lighting apparatus 30 at a height of 9 m may be suitable for a 7.6 m-wide road when driven according to the control scheme as described for FIG. 4A.

In another embodiment, a similar luminaire head as described in the previous paragraph may be controlled according to the following control scheme: the first three rows of LEDs 41, 42, and 43 are switched on, and the last row of LEDs 44 is switched off. Thus the light distribution may be adapted to be suitable for a 5 m-wide road. However, the resulting light distribution may also be broader than by using the previous control scheme and the distance between two luminaires along the road might have to be increased.

Figure 5A:
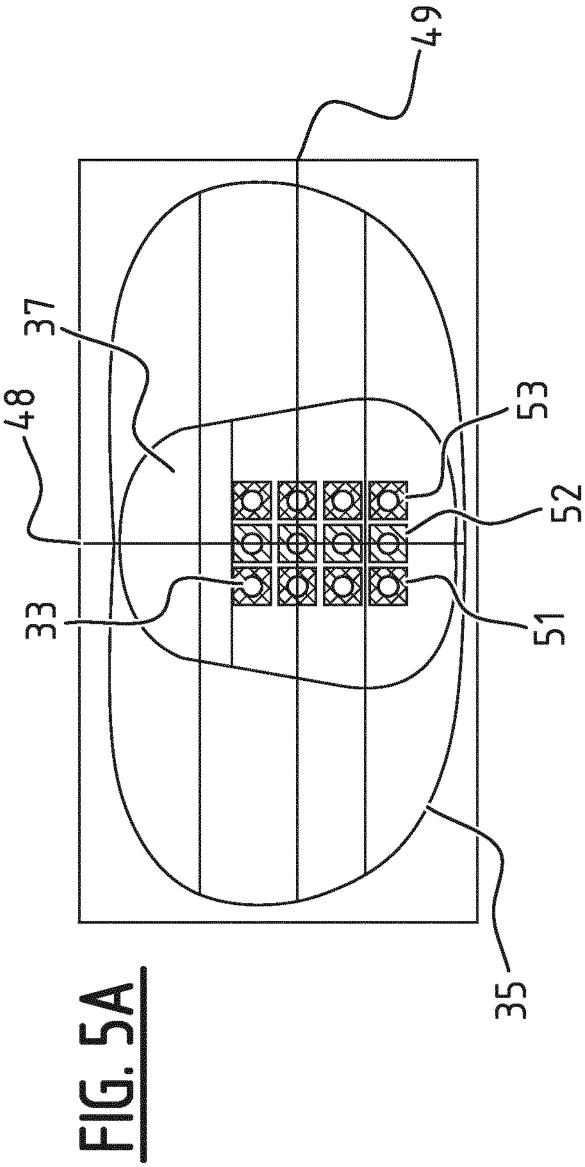
FIGS. 5A and 5B further illustrate an exemplary embodiment of a light distribution setting of a lighting apparatus according to the invention.
Figure 5B:
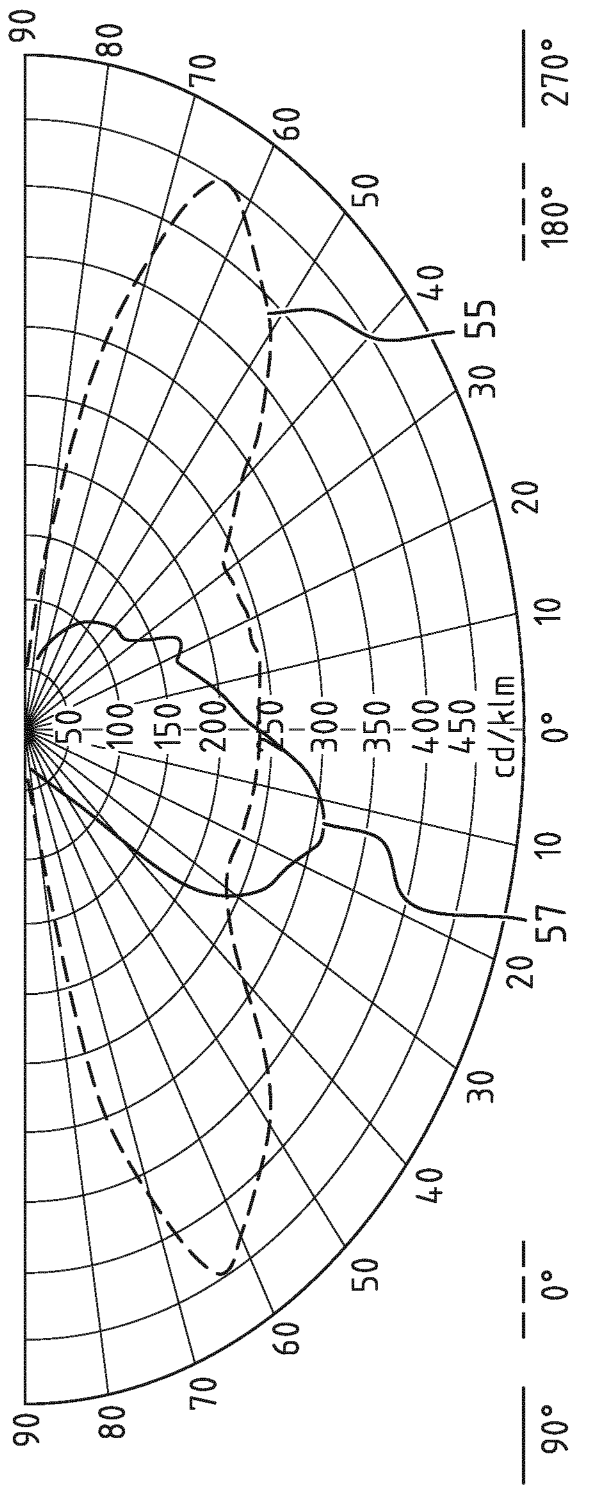

FIGS. 5A and 5B further illustrate an exemplary embodiment of a light distribution setting of the lighting apparatus according to the present invention. The lighting apparatus 30 is similar to the one of FIG. 3 and FIG. 3A. FIG. 5A shows in detail a subset 32 of FIG. 3. In this embodiment a first, second and third group of LEDs may be formed by first, second and third columns 51, 52, 53 of LEDs of the plurality of subsets 32, respectively. In an exemplary embodiment, only the control scheme differs between FIG. 5 and FIG. 4.

The control scheme may be as illustrated in FIG. 5A: the first column 51 and the last column of LEDs 53 are switched on at 100% of their intensities, and the middle column of LEDs 52 is switched on at 50% of its intensity. The intensities at which LEDs are switched on are not limited to 0%, 50%, or 100% of their maximum intensity. A LED may be switched on at any percentage of its maximum intensity represented as an integral number between 0 and 100.

FIG. 5B is a graph illustrating the light distribution achieved by a lighting apparatus 30 according to the control scheme described in FIG. 5A. From the curves 55 and 57 at 0° and 90° respectively, it may be noticed that a light distribution with more light emitted forward than backward may be obtained. Additionally, the light distribution is broad at the vertical of the point source simulated. A luminaire head comprising this lighting apparatus 30 at a height of 9 m may be suitable for a 7 m-wide road when driven according to the control scheme as described for FIG. 5A.

The advantage of this light distribution may be its reduced glare index due to the lower light intensity of the middle column of LEDs 52.

The skilled person will understand that various control schemes can be implemented to control the light distribution of the plurality of LEDs 33 associated to the plurality of lens elements 35 in an appropriate manner in accordance to the intended usage.

Figure 6A:
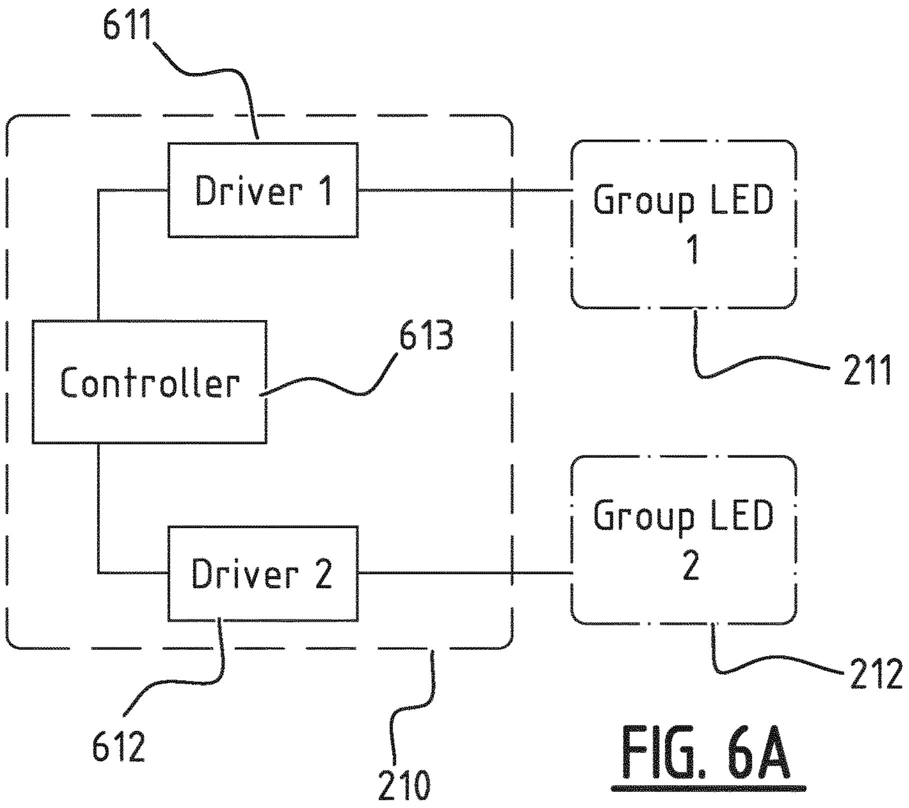
FIGS. 6A-D schematically illustrate further exemplary embodiments of a lighting apparatus according to the invention.
Figure 6B:
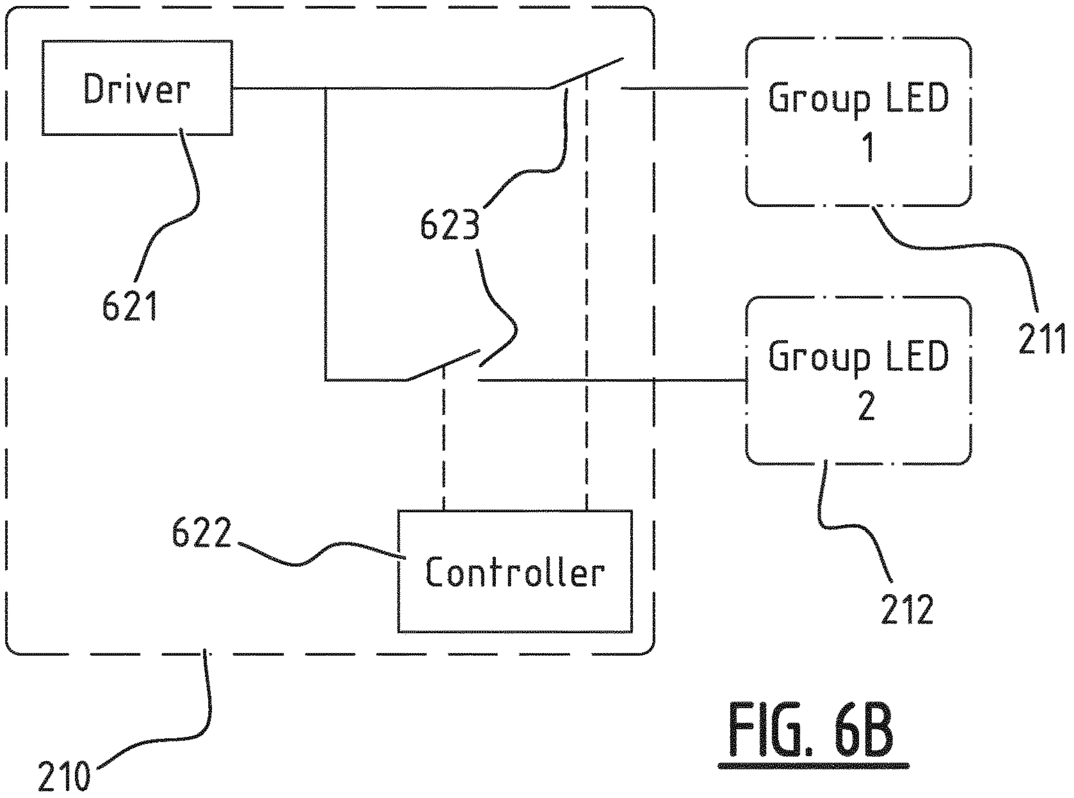
Figure 6C:
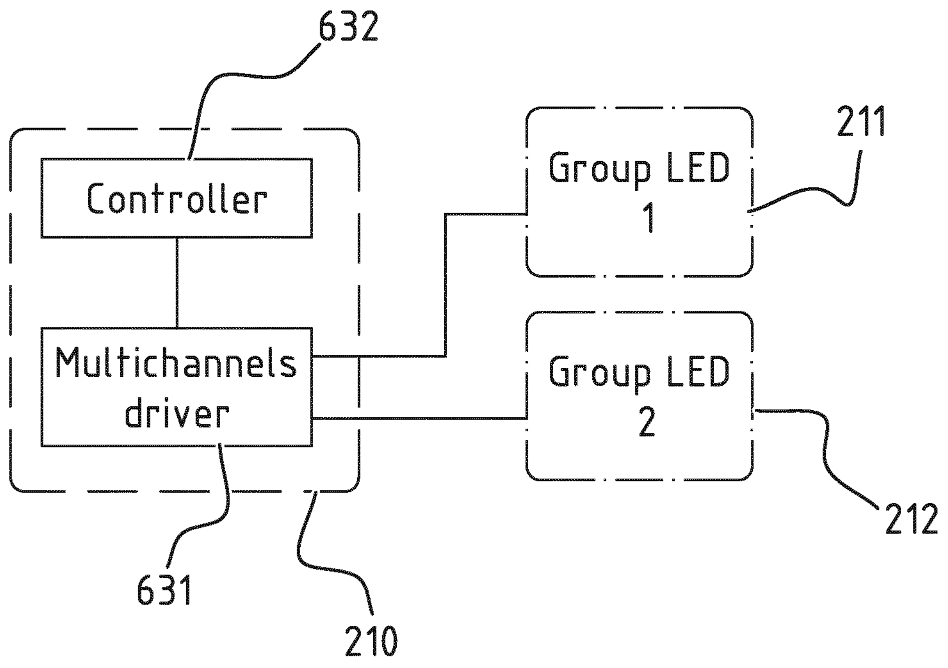

FIGS. 6A-D schematically illustrate further exemplary embodiments of a lighting apparatus according to the present invention. FIG. 6A-C show exemplary embodiments similar as the embodiment of FIG. 2 which may be implemented in a variety of ways.

A controller 613, 622, 632, 645 may comprise a wired or wireless digital communication interface configured to receive external signals for performing the controlling of the driving of the plurality of groups 211 and 212. This may be any digital communication interface such as DMX, DALI, Bluetooth, Wifi, Zigbee, GPRS, LoRa etc. configured to receive the signals wirelessly or in a wired way.

As illustrated in FIG. 6A, the drive and control means 210 may comprise a first driver 611 for driving the first group 211 and a second driver 612 for driving the second group 212, and a controller 613 configured for controlling the first driver 611 and the second driver 612. Optionally, the first driver 611 and the second driver 612 may be associated to a dimmer.

Alternatively, as illustrated in FIG. 6B, the drive and control means 610 may comprise a driver 621 common to the first group 211 and the second group 212, a plurality of controllable switching elements 623 arranged for being controlled to selectively drive the first group 211 and/or the second group 212, and a controller 622 configured to control the plurality of controllable switching elements 623. The controllable switching elements may alternatively be controlled manually, or via a digital communication interface.

As illustrated in FIG. 6C, a current regulation may be performed by a dimmable multi-channels driver 631 which allows performing a dimming on each group 211, 212 of LEDs 121.

The multi-channel driver 631 may be controlled by a controller 632. In a multi-channel driver 631, different driving elements drive different groups of LEDs 211, 212.

Figure 6D:
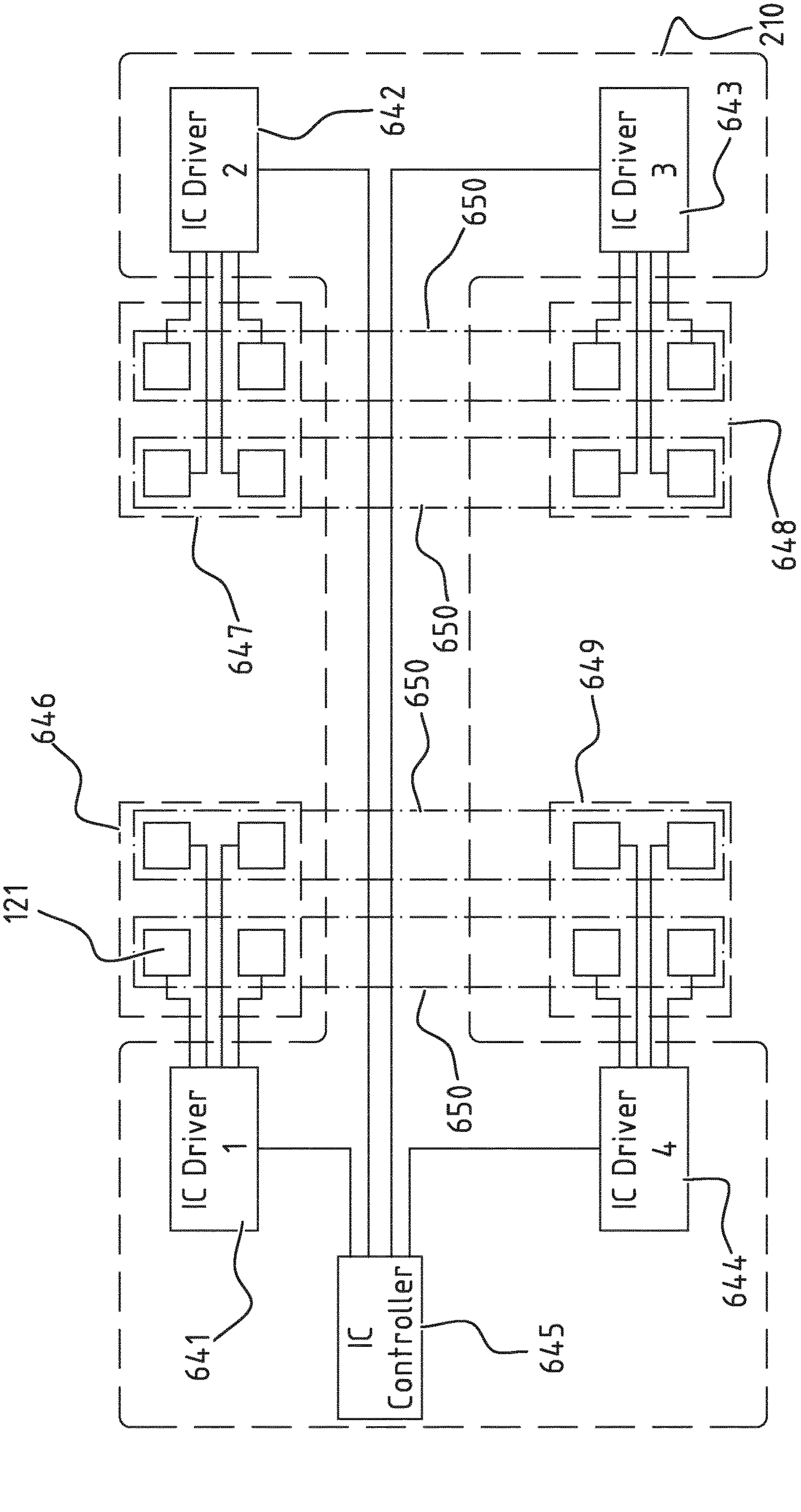

Preferably, the controller and the plurality of drivers may be designed as one or more integrated circuits (IC) 641, 642, 643, 644, and 645 on the support substrate, as illustrated on FIG. 6D.

In another embodiment in accordance with the present invention, there may be four LED subsets 646, 647, 648, and 649 of four LEDs 121 each. Each LED subset 646, 647, 648, and 649 may be provided with an IC driver 641, 642, 643, and 644 to drive the LEDs 121 of a subset. The IC driver 641, 642, 643, and 644 may be controlled by an IC controller 645. The IC drivers 641, 642, 643, and 644 may be configured for performing the selective driving of each LED 121 of the plurality of groups 650. The plurality of groups 650, e.g. a column of four LEDs 121, may be redefined more easily in the exemplary embodiment because of the selective driving of each LED 121. As way of example, the plurality of groups 650 may consist of four groups comprising each one LED 121 from each subset 646, 647, 648, and 649 similarly positioned in each subset 646, 647, 648, and 649.

The skilled person will understand that various control schemes as well as control and drive means 210 may be implemented to control the light distribution of the plurality of LEDs 121 in an appropriate manner in accordance to the intended usage.

The invention claimed is:

1. A lighting apparatus comprising:

a support substrate;

a plurality of subsets mounted on the support substrate, said plurality of subsets comprising at least a first subset having a plurality of LEDs and a second subset having at least one LED;

wherein LEDs of the plurality of subsets are divided in a plurality of groups; wherein the plurality of groups comprises at least: a first group of LEDs comprising at least one LED of the first subset and at least one LED of the second subset; and a second group of LEDs comprising at least one LED of at least the first subset;

a corresponding plurality of lens elements mounted such that each subset is covered by a lens element of the plurality of lens elements; and a drive and control means configured to drive selectively the plurality of groups of LEDs wherein LEDs of the same group are driven simultaneously.

2. The lighting apparatus of claim 1, wherein the drive and control means is configured for controlling the plurality of groups according to a plurality of control schemes comprising at least:

a first control scheme for which the plurality of groups is switched on; and a second control scheme for which at least one group of LEDs of the plurality of groups is switched off, and at least one group of LEDs of the plurality of groups is switched on.

3. The lighting apparatus of claim 2, wherein the plurality of control schemes further comprises:

a third control scheme for which at least one group of LEDs of the plurality of groups is switched on at a dimmed intensity.

4. The lighting apparatus of claim 1, wherein each subset of the plurality of subsets has the same number of LEDs.

5. The lighting apparatus of claim 1, wherein the drive and control means comprises:

a digital communication interface configured to receive signals for performing the controlling of the driving of the plurality of groups.

6. The lighting apparatus of claim 1, wherein the drive and control means comprises at least one of the following:

a multi-channel driver comprising a first driver for driving the first group of LEDs and a second driver for driving the second group of LEDs; or a driver common to the first group and the second group of LEDs, and a plurality of controllable switching elements arranged for being controlled to selectively drive (i) only the first group of LEDs, (ii) only the second group of LEDs, or (iii) the first group and the second group of LEDs together.

7. The lighting apparatus of claim 1, wherein the plurality of subsets comprises at least three subsets of LEDs.

8. The lighting apparatus of claim 1, wherein the plurality of groups of LEDs comprises at least three groups of LEDs.

9. The lighting apparatus of claim 1, wherein each of the plurality of lens elements comprises a free form lens element having a first surface and a second surface located on opposite sides thereof, wherein the first surface is a convex surface and the second surface is a concave surface; wherein the second surface faces the plurality of LEDs of the corresponding subset of LEDs.

10. The lighting apparatus of claim 9, wherein the lens element has a maximum longitudinal dimension different from a maximum lateral dimension.

11. The lighting apparatus of claim 1, wherein at least the first subset is arranged as an array of LEDs with at least two rows of LEDs and at least two columns of LEDs.

12. The lighting apparatus of claim 11, wherein the at least one LED of the first subset of the first group of LEDs comprises a first row of LEDs of the at least two rows of LEDs of the first subset, and wherein the at least one LED of the first subset of the second group of LEDs comprises a second row of LEDs of the at least two rows of LEDs of the first subset.

13. The lighting apparatus of claim 1, wherein each subset comprises at least four LEDs.

14. The lighting apparatus of claim 1, wherein the plurality of subsets is configured to emit light having substantially the same color.

15. The lighting apparatus of claim 1, wherein each group of the plurality of groups comprises at least one LED of each subset, said at least one LED being similarly positioned in each subset.

16. A luminaire having a lighting apparatus according to claim 1.

17. A method for controlling a lighting apparatus according to claim 1, comprising controlling the driving of the plurality of LEDs to drive selectively the plurality of groups of LEDs, such that LEDs of the same group are driven simultaneously.

18. The method of claim 17, wherein the controlling comprises controlling the plurality of groups according to a plurality of control schemes comprising at least:

a first control scheme for which the plurality of groups is switched on;

a second control scheme for which at least one group of LEDs of the plurality of groups is switched off, and at least one group of LEDs of the plurality of groups is switched on.

19. The method of claim 18, wherein the plurality of control schemes further comprises:

a third control scheme for which at least one group of LEDs of the plurality of groups is switched on at a dimmed intensity.

20. A computer program comprising computer-executable instructions to perform the method, when the program is run on a computer, according to claim 17.

* * * * *